(12) United States Patent
Takata et al.

(10) Patent No.: US 10,701,087 B2
(45) Date of Patent: Jun. 30, 2020

(54) ANALYSIS APPARATUS, ANALYSIS METHOD, AND ANALYSIS PROGRAM

(71) Applicant: NIPPON TELEGRAPH AND TELEPHONE CORPORATION, Chiyoda-ku (JP)

(72) Inventors: Yuta Takata, Musashino (JP); Mitsuaki Akiyama, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 178 days.

(21) Appl. No.: 15/768,624

(22) PCT Filed: Oct. 17, 2016

(86) PCT No.: PCT/JP2016/080708
§ 371 (c)(1),
(2) Date: Apr. 16, 2018

(87) PCT Pub. No.: WO2017/077847
PCT Pub. Date: May 11, 2017

(65) Prior Publication Data
US 2018/0316696 A1    Nov. 1, 2018

(30) Foreign Application Priority Data
Nov. 2, 2015   (JP) .................................. 2015-215469

(51) Int. Cl.
*H04L 29/06* (2006.01)
*G06F 16/958* (2019.01)
(Continued)

(52) U.S. Cl.
CPC .......... *H04L 63/1416* (2013.01); *G06F 11/34* (2013.01); *G06F 16/9024* (2019.01);
(Continued)

(58) Field of Classification Search
CPC ............... H04L 63/1416; G06F 16/986; G06F 16/9024; G06F 11/34; G06F 21/53; G06F 21/55; G06F 16/9566
See application file for complete search history.

(56) References Cited

U.S. PATENT DOCUMENTS 6,976,210 B1 * 12/2005 Silva .................... G06F 16/9577
715/205
8,176,556 B1 * 5/2012 Farrokh .............. H04L 63/1483
713/188
(Continued)

FOREIGN PATENT DOCUMENTS

EP     3 190 536 A1    7/2017
JP     2011-13974 A    1/2011

OTHER PUBLICATIONS

Nunan et al., Automatic Classification of Cross-Site Scripting in Web Pages Using Document-based and URL-based Features, Jul. 2012, IEEE Symposium on Computers and Communications, pp. 702-707 (Year: 2012).*

(Continued)

*Primary Examiner* — Kenneth W Chang
(74) *Attorney, Agent, or Firm* — Oblon, McClelland, Maier & Neustadt, L.L.P.

(57) ABSTRACT

A browser emulator manager causes a browser emulator(s) to access a website. The browser emulator traces content interpretation and script execution on a browser that have occurred by access to the website. When detecting transfer, the browser emulator records, in transfer information, a transfer method, a transfer source URL, and a transfer destination URL thereof. When detecting the script execution, the browser emulator records, in the transfer information, an execution method and an execution source script thereof. A graph construction unit constructs a directed graph on the basis of the transfer information. Thereafter, a graph analysis unit specifies places of content and a script causing the transfer by tracing the directed graph.

7 Claims, 15 Drawing Sheets

(51) Int. Cl.
  G06F 16/901 (2019.01)
  G06F 16/955 (2019.01)
  G06F 21/55 (2013.01)
  G06F 11/34 (2006.01)
  G06F 21/53 (2013.01)
(52) U.S. Cl.
  CPC ........ *G06F 16/9566* (2019.01); *G06F 16/986* (2019.01); *G06F 21/53* (2013.01); *G06F 21/55* (2013.01)

(56) References Cited

U.S. PATENT DOCUMENTS

| | | | | |
|---|---|---|---|---|
| 2010/0186088 | A1* | 7/2010 | Banerjee | G06F 21/51 726/23 |
| 2011/0289582 | A1* | 11/2011 | Kejriwal | G06F 21/566 726/22 |
| 2013/0055400 | A1* | 2/2013 | Lee | H04L 63/1433 726/25 |
| 2015/0200962 | A1* | 7/2015 | Xu | G06F 21/562 726/23 |
| 2015/0222657 | A1* | 8/2015 | Chu | G06F 21/128 726/23 |
| 2015/0261955 | A1 | 9/2015 | Huang et al. | |

OTHER PUBLICATIONS

International Search Report dated Dec. 20, 2016 in PCT/JP2016/080708 filed Oct. 17, 2016.

Lu, L. et al., "BLADE: An Attack-Agnostic Approach for Preventing Drive-By Malware Infections", Proceedings of the ACM Conference on Computer and Communications Security (CCS), 2010, pp. 440-450.

Cova, M. et al., "Detection and Analysis of Drive-by-Download Attacks and Malicious JavaScript Code", Proceedings of the World Wide Web Conference (WWW), 2010, 10 total pages.

Stokes, J. W. et al., "WebCop: Locating Neighborhoods of Malware on the Web", Proceedings of $3^{rd}$ USENIX conference on Large-scale exploits and emergent threats (LEET), 2010, 8 total pages.

Zhang, J. et al., "ARROW: Generating Signatures to Detect Drive-By Downloads", Proceedings of the World Wide Web Conference (WWW), 2011, 10 total pages.

Borgolte, K. et al., "Delta: Automatic Identification of Unknown Web-based Infection Campaigns", Proceedings of the ACM Conference on Computer and Communications Security (CCS), 2013, 12 total pages.

Li, Z. et al., "Hunting the Red Fox Online: Understanding and Detection of Mass Redirect-Script Injections", Proceedings of the IEEE Symposium on Security and Privacy (S&P), 2014, 16 total pages.

"TripWire; Open Source Roots to Enterprise Security Leader", Open Source Tripwire | Tripwire, Sep. 20, 2016, http://www.tripwire.org/, 3 total pages.

Shibahara, T. et al., "Detecting Malicious Web Pages based on Structural Similarity of Redirection Chains", Computer Security Symposium 2015 Ronbunshu [CD-ROM], Oct. 21, 2015, vol. 2015, No. 3, 29 total pages (with English translation).

Extended European Search Report dated Mar. 8, 2019 in European Patent Application No. 16861914.6, 6 pages.

Takata, Y. et al., "MineSpider: Extracting URLs from Environment-dependent Drive-by Download Attacks", 2015 IEEE 39th Annual International Computers, Software & Applications Conference, XP033207349, vol. 2, Jul. 1, 2015, pp. 444-449.

Nelms, T. et al., "WebWitness: Investigating, Categorizing, and Mitigating Malware Download Paths", Usenix, Usenix, The Advanced Computing Systems Association, XP061024877, Aug. 2015, pp. 1025-1040.

* cited by examiner

FIG.3A

```
GET / HTTP/1.1
Host: landing.example
Accept-Language: en-us
Accept-Encoding: gzip, deflate
Accept: */*
User-Agent: Mozilla/4.0 (compatible; MSIE
8.0; Windows NT 6.1; Trident/4.0; .NET
CLR 1.1.4322; .NET CLR 2.0.50727)
```

FIG.3B

```
HTTP/1.1 301 Moved Permanently
Date: Mon, 01 Jan 2015 00:00:00 GMT
Server: Apache
Location: http://redirect.example/
Content-Length: 100
Content-Type: text/html; charset=utf-8
```

FIG.4

```
<iframe src="http://tag.example/"></iframe>
<frame src="http://tag.example/"></frame>
<script src="http://tag.example/"></script>
<embed src="http://tag.example/"></embed>
<applet archive="http://tag.example/"></applet>
<object data="http://tag.example/"></object>
<meta content="10; URL=http://tag.example/" />
```

FIG.5A

```
location.href = "http://js.example/";
location.assign("http://js.example/");
location.replace("http://js.example/");
window.location = "http://js.example/";
XMLHttpRequest.open("GET","http:/js.example/");
```

FIG.5B

```
document.write("<script ...> </script>");
document.writeln("<object ...> </object>");
element.innerHTML = "<iframe ...> </iframe>";
element.setAttribute("src", "http://js.example/");
```

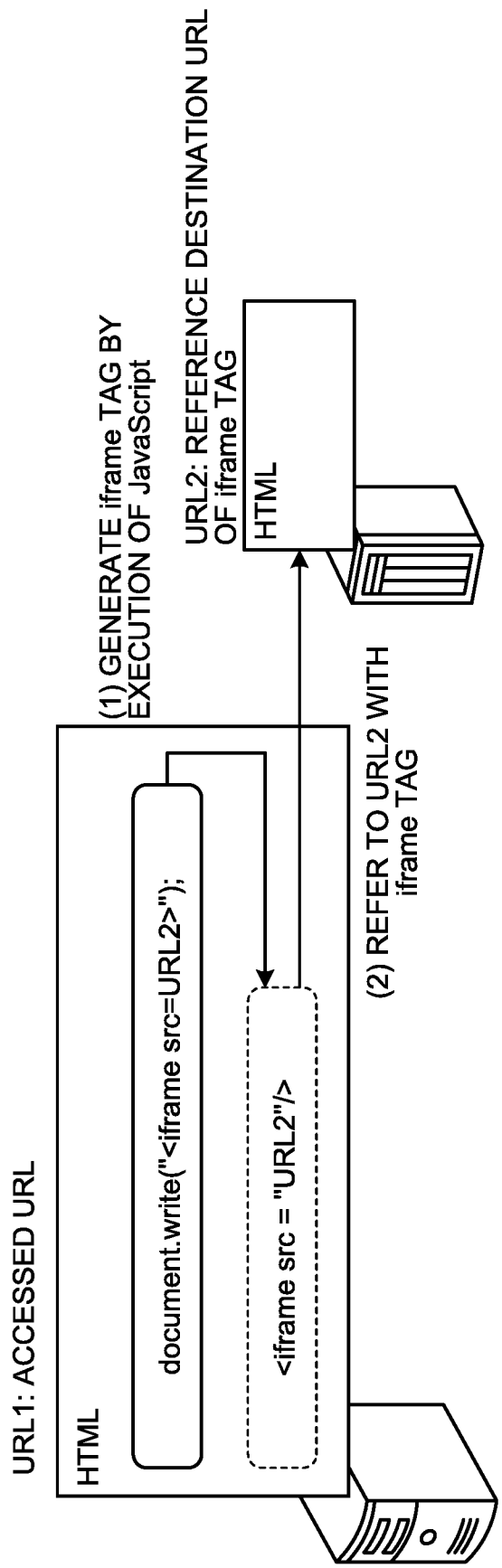

FIG.11A

| ID | TIME STAMP | ACCESS URL | ENVIRONMENT INFORMATION |
|---|---|---|---|
| 1 | 2015/01/01 01:02:03.0000 | http://a.example/ | IE6, Java1.6.0, PDF9.1.0 |
| ... | ... | ... | |
| 51 | 2015/01/01 07:08:09.0000 | http://c.example/test.html | IE6, Java1.6.0, PDF9.1.0 |
| ... | ... | ... | |

FIG.11B

| ID | TIME STAMP | TRANSFER SOURCE URL | TRANSFER DESTINATION URL | METHOD | EXECUTION SCRIPT | GENERATED SCRIPT |
|---|---|---|---|---|---|---|
| 1 | 2015/01/01 01:02:03.0000 | Origin | http://a.example/ | | | |
| 1 | 2015/01/01 01:02:04.0000 | http://a.example/ | http://b.example/red1/ | iframe | | |
| 1 | 2015/01/01 01:02:05.0000 | http://b.example/red1/ | http://b.example/red2/ | location.href | 0123456789abcdef | |
| 1 | 2015/01/01 01:02:06.0000 | http://b.example/red2/ | | eval | abcdef9876543210 | 0123456789901234 |
| 1 | 2015/01/01 01:02:07.0000 | http://b.example/red2/ | http://b.example/exploit/ | location.replace | 0123456789901234 | |
| ... | ... | ... | ... | | | |
| 51 | 2015/01/01 07:08:09.0000 | Origin | http://c.example/test.html | | | |
| 51 | 2015/01/01 07:08:10.0000 | http://c.example/test.html | http://c.example/c.js | script | | |
| 51 | 2015/01/01 07:08:11.0000 | http://c.example/c.js | http://d.example/red3 | document.write /iframe | fedcbaaaaabcdef | |
| 51 | 2015/01/01 07:08:12.0000 | http://d.example/red3 | http://d.example/exploit | HTTP301 | | |
| ... | ... | | | | | |

ANALYSIS APPARATUS, ANALYSIS METHOD, AND ANALYSIS PROGRAM

FIELD

The present invention relates to an analysis apparatus, an analysis method, and an analysis program.

BACKGROUND

A drive-by download attack transfers a client that has accessed a website as a starting point of the attack (hereinafter, referred to as a landing URL) to a plurality of websites (hereinafter, referred to as redirect URLs) mainly using a hypertext markup language (HTML) tag and a code of JavaScript (registered trademark) or the like, and then, transfers the client to a malicious website (hereinafter, referred to as an exploit URL) executing an attack code. When the client accesses the exploit URL, the attack code abusing vulnerability of a browser or a browser plug-in (hereinafter, referred to as a plug-in) is executed and the client is forced to download and install a malicious program (malware) such as computer viruses from a specific website (hereinafter, referred to as a malware distribution URL).

There are various methods for transferring the client to the specific URL, such as a method in which the client is transferred to a URL designated with an HTML tag, a method in which the client is transferred to the URL designated using the code of JavaScript or the like, and a method in which the client is transferred using the 300's status code of hypertext transfer protocol (HTTP). The client can also be transferred to a URL designated with an inserted HTML tag by dynamically generating the HTML tag with the code of JavaScript or the like and inserting the HTML tag into HTML loaded onto a browser. The drive-by download attack transfers the client that has accessed the landing URL to the malware distribution URL by combining various transfer codes.

In many cases, the website that is used for the landing URL is a website of a URL contained in a spam mail or messaging service of social network service (SNS) or a general website illegally compromised by an attacker. In particular, the case in which a general website becomes the landing URL by compromise of the website and is involved in the drive-by download attack has a large influence and causes numerous malware infection damages. The website compromise never ceases and it is necessary to detect the compromise quickly, specify and modify contents (for example, a transfer code inserted by the compromise) of the compromised website, and thereby prevent spread of infection by the drive-by download attack.

As a method for detecting the drive-by download attack, a method in which change in a file system due to download of malware from a malware distribution URL is detected (see Non-Patent Document 1), a method in which malicious JavaScript is detected by executing JavaScript with an emulator of a browser (hereinafter, referred to as a browser emulator) and analyzing an execution result (see Non-Patent Document 2), and the like have been known.

In addition, a method in which a link structure from a landing URL to a malware distribution URL is specified and the link structure is traced in the reverse order from the malware distribution URL to efficiently search for malicious websites present in the vicinity of the malicious website (see Non-patent Document 3), a URL signature generation method in which URLs common to respective link structures collected by patrolling a plurality of websites are specified using the link structures to efficiently detect and interrupt access to malicious URLs such as an exploit URL conducting a drive-by download attack and a malware distribution URL (see Non-Patent Document 4), and the like have been known.

All of the above-mentioned methods are however methods for detecting the malicious URL and cannot specify the content and the script involved in the attack in the website of the detected malicious URL. That is to say, when the landing URL is the compromised website, a compromised place of the content in the website cannot be specified.

As a method for detecting website compromise, a method in which content (original content) before compromise and content after compromise are compared has been known. For example, a method in which comparison and detection are performed using HTML as the original content (see Non-Patent Document 5), a method in which comparison and detection are performed using a notable library or framework of JavaScript as the original content (see Non-Patent Document 6), and the like have been known.

In addition, there is a tool called TripWire (see Non-Patent Document 7) monitoring files that are previously stored on a web server and notifying a web server manager of detection of an operation such as change or deletion of contents of any of the files by transmitting a mail thereto when such operation is detected.

CITATION LIST

Patent Literature

Non Patent Literature 1: L. Lu, V. Yegneswaran, P. Porras, and W. Lee, "BLADE: An Attack-Agnostic Approach for Preventing Drive-By Malware Infections", in Proceedings of the ACM Conference on Computer and Communications Security (CCS), 2010, [searched on Jul. 24, 2015], Internet <URL: http://www.csl.sri.com/users/vinod/papers/blade.pdf>

Non Patent Literature 2: M. Cova, C. Kruegel, and G. Vigna, "Detection and Analysis of Drive-by-Download Attacks and Malicious JavaScript Code", in Proceedings of the World Wide Web Conference (WWW), 2010, [searched on Jul. 24, 2015], Internet <URL: http://www.cs.ucsb.edu/~vigna/publications/2010_cova_kruegel_vigna_Wepawet.pdf>

Non Patent Literature 3: J. W. Stokes, R. Andersen, C. Seifert, and K. Chellapilla, "WebCop: Locating Neighborhoods of Malware on the Web", in Proceedings of 3rd USENIX conference on Large-scale exploits and emergent threats (LEET), 2010, [searched on Jul. 24, 2015], Internet <URL: https://www.usenix.org/legacy/event/leet10/tech/full_papers/Stokes.pdf>

Non Patent Literature 4: J. Zhang, C. Seifert, J. W. Stokes, and W. Lee, "ARROW: Generating Signatures to Detect Drive-by Downloads", in Proceedings of the World Wide Web Conference (WWW), 2011, [searched on Jul. 24, 2015], Internet <URL: http://research.microsoft.com:8082/pubs/150143/zhangArrow.pdf>

Non Patent Literature 5: K. Borgolte, C. Kruegel, and. Vigna, "Delta: Automatic Identification of Unknown Web-based Infection Campaigns", in Proceedings of the ACM Conference on Computer and Communications Security (CCS), 2013, [searched on Jul. 24, 2015], Internet <https://www.cs.ucsb.edu/~chris/research/doc/ccs13_delta.pdf>

Non Patent Literature 6: Z. Li, S. Alrwais, X. Wang, and E. Alowaisheq, "Hunting the Red Fox Online: Understanding and Detection of Mass Redirect-Script Injections", in Proceedings of the IEEE Symposium on Security and Privacy (S&P), 2014, [searched on Jul. 24, 2015], Internet <http://ieeexplore.ieee.org/stamp/stamp.jsp?arnumber=6956553>

Non-Patent Document 7: TripWire Inc., "TripWire", [searched on Jul. 24, 2015], Internet <http://www.tripwire.org/>

SUMMARY

Technical Problem

The above-mentioned website compromise detection methods however have limitations such as the necessity of the content before compromise or applicability to only websites on a web server that is managed by the system itself. Due to the limitations, it is difficult to specify a content place and a script place causing transfer and a URL involved in the transfer in the drive-by download attack in some cases. An object of the present invention is to solve the above-mentioned problems and specify a content place and a script place causing transfer and a URL involved in the transfer in a drive-by download attack.

Solution to Problem

To solve the above-described problems, the present invention is an analysis apparatus analyzing content and a script of a website, the analysis apparatus comprising: an access unit that accesses the website using a browser; a script analysis unit that records, in transfer information, a URL of the website as a transfer source URL, a URL of another website as a transfer destination URL, a function name or a property name of the script used for transfer as a transfer method to the transfer destination URL, and identification information of the script as an execution source script when the transfer to the other website is caused by execution of the script in the website, and records, in the transfer information, identification information of a generation source script of a new script as the execution source script in the website, identification information of the new script as a generated script, and a function name or a property name of the generation source script used for generation as a script execution method when the script of the website generates the new script; and a graph construction unit that constructs a directed graph representing URLs of a series of websites that the browser has accessed, the transfer method to the URL, the script used for the transfer, and the script execution method while the transfer source URL and the transfer destination URL recorded in the transfer information are nodes, the execution source script and the generated script in the transfer source URL are nodes encapsulated in the node of the transfer source URL, and the transfer method and the script execution method recorded in the transfer information are edges.

Advantageous Effects of Invention

According to the present invention, a content place and a script place causing transfer and a URL involved in the transfer can be specified in a drive-by download attack.

BRIEF DESCRIPTION OF DRAWINGS

FIG. 3A is a diagram illustrating an example of an HTTP request header.

FIG. 3B is a diagram illustrating an example of an HTTP response header.

FIG. 4 is a diagram illustrating examples of an HTML tag referring to a URL.

FIG. 5A is a diagram illustrating examples of a function and a property that are used for transfer by JavaScript.

FIG. 5B is a diagram illustrating examples of a function and a property of JavaScript for manipulating an HTML tag or an attribute.

FIG. 6 is a diagram illustrating an example of transfer by internal reference JavaScript.

FIG. 11A is a diagram illustrating an example of access logs accumulated in an analysis information database.

FIG. 11B is a diagram illustrating an example of pieces of transfer information accumulated in the analysis information database.

DESCRIPTION OF EMBODIMENTS

Hereinafter, a mode for carrying out the present invention (embodiments) will be described with reference to the accompanying drawings. It should be noted that the present invention is not limited by the following embodiments.

Figure 1:
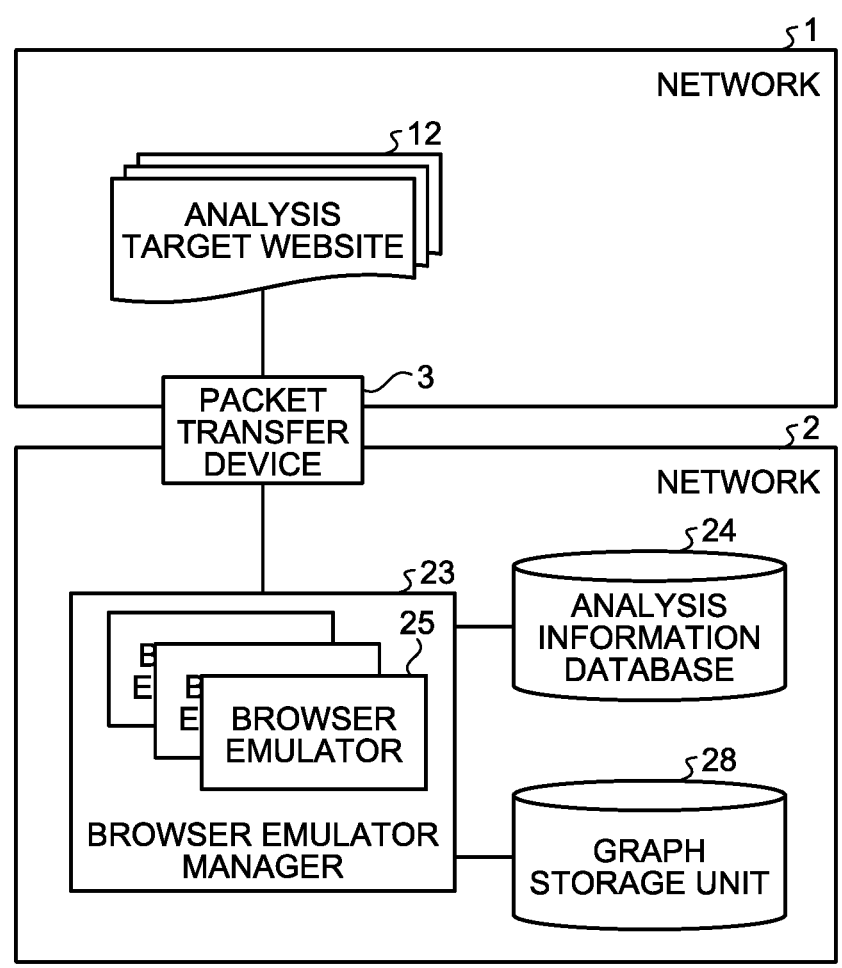
FIG. 1 is a diagram illustrating an example of the system configuration in the embodiment.

First, an example of the system configuration in the embodiment will be described with reference to FIG. 1. A system includes, for example, a network 1 and a network 2 as illustrated in FIG. 1. The network 1 and the network 2 are connected to each other by a packet transfer device 3.

The network 1 includes analysis target websites 12. The network 1 may be a wide-area network such as the Internet, a small and middle-area network such as a corporation network, or a network of a cloud environment or a hosting environment.

The analysis target websites 12 are analysis target websites by a browser emulator manager (analysis device) 23. The analysis target websites 12 are, for example, websites being on a published blacklist of malicious websites and websites capable of being collected through a search engine.

The network 2 includes the browser emulator manager 23, an analysis information database 24, and a graph storage unit 28. The network 2 may be a small-area network such as a local area network, a small and middle-area network such as a corporation network, or a network of a cloud environment or a hosting environment.

The browser emulator manager 23 manages equal to or more than one browser emulators 25 and causes the browser emulator(s) 25 to access predetermined websites (analysis target websites 12). The browser emulator manager 23 accumulates, in the analysis information database 24, URLs of the websites that the browser emulator(s) 25 has(have) accessed and pieces of information provided by analyzing contents and scripts acquired from the websites.

The browser emulator 25 is a device simulating operations of a browser. Although, for example, a browser emulator provided by a Honeynet project, or HtmlUnit or Phantom JS developed as open sources can be applied to the browser emulator 25, the browser emulator 25 is not limited thereto. Details of the browser emulator 25 will be described later. Although the browser emulator 25 is constructed in the browser emulator manager 23 in FIG. 1, it is needless to say that it may be constructed outside the browser emulator manager 23.

The analysis information database 24 accumulates therein the URLs of the websites that the browser emulator(s) 25 has(have) accessed, pieces of information related to transfer caused by interpretation of contents acquired from the websites, and the like. The pieces of information may be stored in the analysis information database 24 using a relational database management system (RDBMS) or in a text format. Details of the analysis information database 24 will be described later.

The graph storage unit 28 stores therein a directed graph (see FIG. 9, FIG. 10A, and FIG. 10B) representing transfer between URLs that has been constructed by the browser emulator manager 23. Details of the directed graph will be described later.

Although the browser emulator manager 23, the browser emulator(s) 25, and the analysis information database 24 are arranged in the same network in the embodiment, they may be arranged in different networks. Furthermore, in order to connect the respective components securely, communication information may be encrypted by employing an existing encryption technique, or the networks in which the respective functions are arranged or the respective functions may be connected via a virtual private network (VPN).

Figure 2:
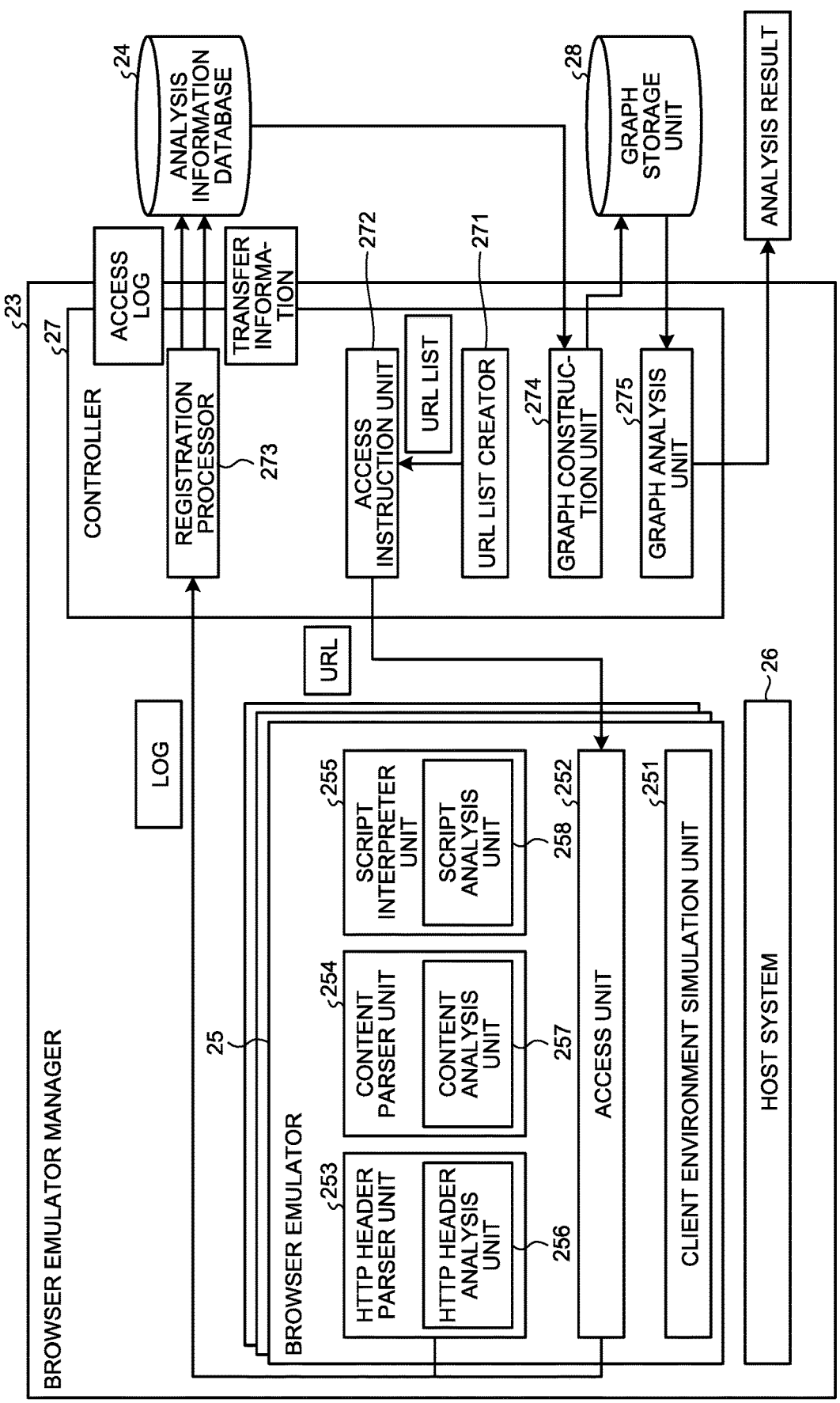
FIG. 2 is a diagram illustrating an example of the configuration of a browser emulator manager.

Next, the browser emulator manager 23 and the browser emulator 25 will be described in detail with reference to FIG. 2. The browser emulator manager 23 includes the browser emulator(s) 25 and a controller 27. The controller 27 causes the browser emulator(s) 25 to operate on a host system 26 included in the browser emulator manager 23. For example, an operating system (OS) included in the browser emulator manager 23 is used as the host system 26. Details of the controller 27 will be described later.

Browser Emulator

Next, the browser emulator 25 will be described. The browser emulator 25 includes a client environment simulation unit 251, an access unit 252, an HTTP header parser unit 253, a content parser unit 254, and a script interpreter unit 255. The HTTP header parser unit 253 includes an HTTP header analysis unit 256, the content parser unit 254 includes a content analysis unit 257, and the script interpreter unit 255 includes a script analysis unit 258. The HTTP header analysis unit 256, the content analysis unit 257, and the script analysis unit 258 analyze content that the browser emulator 25 has acquired from the analysis target website 12 and record a transfer source URL, a transfer destination URL, a transfer method, and the like when transfer to a different website is detected. Details of the HTTP header analysis unit 256, the content analysis unit 257, and the script analysis unit 258 will be described later.

The client environment simulation unit 251 sets information of client environments (for example, an OS, a browser, and a plug-in) that the browser emulator 25 simulates.

The access unit 252 communicates with a website (for example, the analysis target website 12 in FIG. 1) by HTTP or hypertext transfer protocol secure (HTTPS), and acquires HTTP header information and HTTP body information (content) in the HTTP communication. For example, a cURL developed as free software is used for the access unit 252.

The access unit 252 records, in a log, an access result to the website. The access unit 252 records, in the log, the URL of the website that it has accessed, the date and time of the access, and the environment information of the browser in the access, for example. When the access to the website is transferred to a different website, the transfer destination URL, the transfer source URL, the transfer method, and the like specified by the HTTP header analysis unit 256, the content analysis unit 257, and the script analysis unit 258 are also recorded in the log. That is to say, the log includes two types of information; information (access log) including the URL of the website that the access unit 252 has accessed, the date and time of the access to the URL, and the environment information of the browser in the access to the URL, and information (transfer information) including the transfer destination URL, the transfer source URL, and the transfer method when the transfer occurs. A registration processor 273, which will be described later, registers the log in the analysis information database 24.

The HTTP header parser unit 253 interprets HTTP header information acquired by the access unit 252. A result of the interpretation of the HTTP header information is analyzed using the HTTP header analysis unit 256.

The HTTP header analysis unit 256 analyzes the result of the interpretation of the HTTP header information by the HTTP header parser unit 253 in order to specify a transfer code by HTTP. To be specific, the HTTP header analysis unit 256 records the URL in a Location field of an HTTP response header as the transfer destination URL, the request URL of an HTTP request header to the HTTP response as the transfer source URL, and the number of an HTTP status code as the transfer method when the number of the HTTP status code of the HTTP response header is the 300s (the HTTP status code indicating transfer).

FIG. 3A illustrates an example of the HTTP request header and FIG. 3B is an example of the HTTP response header to the HTTP request header illustrated in FIG. 3A. For example, contents of the HTTP response header illustrated in FIG. 3B indicate that the HTTP response is a transfer code by "HTTP/1.1 301 Moved Permanently". Furthermore, information in the Location field of the HTTP response header illustrated in FIG. 3B indicates that the transfer destination URL is "http://redirect.example/". In addition, information in a Host field of the HTTP request header illustrated in FIG. 3A indicates that the transfer source URL is "http://landing.example/". Accordingly, the HTTP header analysis unit 256 records "http://redirect.example/" as the transfer destination URL, "http://landing.example/" as the transfer source URL, and "HTTP/1.1 301 Moved Permanently" as the transfer method.

The content parser unit 254 interprets the content acquired by the access unit 252. A result of the interpretation of the content is analyzed using the content analysis unit 257. When the content contains a script, the script is interpreted using the script interpreter unit 255. When the content is, for example, HTML or extensible markup language (XML), the content parser unit 254 interprets the content using an HTML/XML parser such as ekoHTML and BeautifulSoup developed as open sources.

The content analysis unit 257 analyzes the result of the interpretation of the content by the content parser unit 254 in order to specify an HTML tag referring to a URL from the content. To be specific, when the content is described by HTML and contains an HTML tag having an attribute for which a URL is designated, the content analysis unit 257 records the designated URL as the transfer destination URL, the URL of the content as the transfer source URL, and an HTML tag name as the transfer method.

FIG. 4 illustrates examples of the HTML tag referring to a URL. In the case of the HTML tag (iframe tag) indicated on the first line in FIG. 4, the transfer source URL is the URL of the content containing the HTML tag, the transfer destination URL is "http://tag.example/", and the transfer method is "iframe". Accordingly, the content analysis unit 257 records "http://tag.example/" as the transfer destination URL, the URL of the content containing the iframe tag as the transfer source URL, and "iframe" as the transfer method. The HTML tags referring to designated URLs are not comprehensively listed in FIG. 4 but all of the listed HTML tags automatically refer to the designated URLs at a time point when the browser loads them. It is needless to say that HTML tags referring URLs other than the HTML tags illustrated in FIG. 4 may or may not be added as analysis targets.

The script interpreter unit 255 interprets the script acquired by the content parser unit 254. When the script is described by JavaScript, for example, the script interpreter unit 255 interprets the script using a JavaScript interpreter such as SpiderMonkey, V8 JavaScript Engine, and Rhino developed as open sources.

The script analysis unit 258 analyzes a result of the interpretation of the script by the script interpreter unit 255 in order to specify the script causing transfer to a different URL. For example, analysis by the script analysis unit 258 in the case in which the script acquired by the content parser unit 254 is JavaScript and function call or property assignment for transfer to a URL designated by JavaScript is executed is supposed. In this case, the script analysis unit 258 records the URL designated by JavaScript as the transfer destination URL, the URL of the content containing the JavaScript as the transfer source URL, and a function name or a property name called by the JavaScript as the transfer method. Furthermore, the script analysis unit 258 records the hash value or the like of the JavaScript as an execution source script. FIG. 5A illustrates examples of the script of the function call and the property assignment for transfer to a designated URL. In the case of the script of the property assignment indicated on the first line in FIG. 5A, the transfer source URL is the URL of the content containing the script, the transfer destination URL is "http://js.example/", and the transfer method is "location.href". Although the hash value of the script is used as identification information of the script in the following description, it is needless to say that another identification information may be used.

Among the scripts, there are a script generating an HTML tag and inserting the generated HTML tag into content from which the script has been read and a script manipulating an attribute. FIG. 5B illustrates examples of such a script (JavaScript).

When, for example, the HTML tag inserted into the content by JavaScript is any of the HTML tags illustrated in FIG. 4, transfer to the URL designated by the generated HTML tag occurs. In the case of JavaScript indicated on the first line in FIG. 5B, the transfer source URL is the URL of the content containing the JavaScript, the transfer destination URL is a URL designated by a script tag, and the transfer method is "script". In this case, in order to distinguish transfer with a simple HTML tag and transfer with the HTML tag inserted by JavaScript from each other, an identifier (for example, the URL designated by the HTML tag) is set to the inserted HTML tag so as to uniquely specify the HTML tag together with the transfer method of "document.write". That is to say, the script analysis unit 258 records not "script" but "document.write and script" as the transfer method when the script tag is inserted by JavaScript indicated on the first line in FIG. 5B. A graph analysis unit 275, which will be described later, can thereby specify the transfer to the transfer destination URL to be not the transfer with the simple HTML tag but the transfer with the HTML tag inserted by the script.

It is needless to say that the analysis target of the script analysis unit 258 may be a function or a property other than the functions and the properties of JavaScript that are illustrated in FIG. 5A and FIG. 5B.

The above-mentioned generation and insertion of the HTML tag by the script enables the transfer source URL and the transfer destination URL to be specified correctly as long as HTML and the script are in the same content. For example, as illustrated in FIG. 6, the case in which the URL that the access unit 252 has accessed is a URL1, an iframe tag is generated by execution of JavaScript in the content of the URL1 ((1)), and a URL2 is referred with the iframe tag ((2)) is supposed. In this case, the transfer source URL (URL1) and the transfer destination URL (URL2) can be correctly specified even by the conventional technique. The conventional technique however misses information of the transfer source URL in some cases when generation and insertion of the HTML tag with the script are performed by referring to HTML and a script in the content of an external website.

Figure 7:
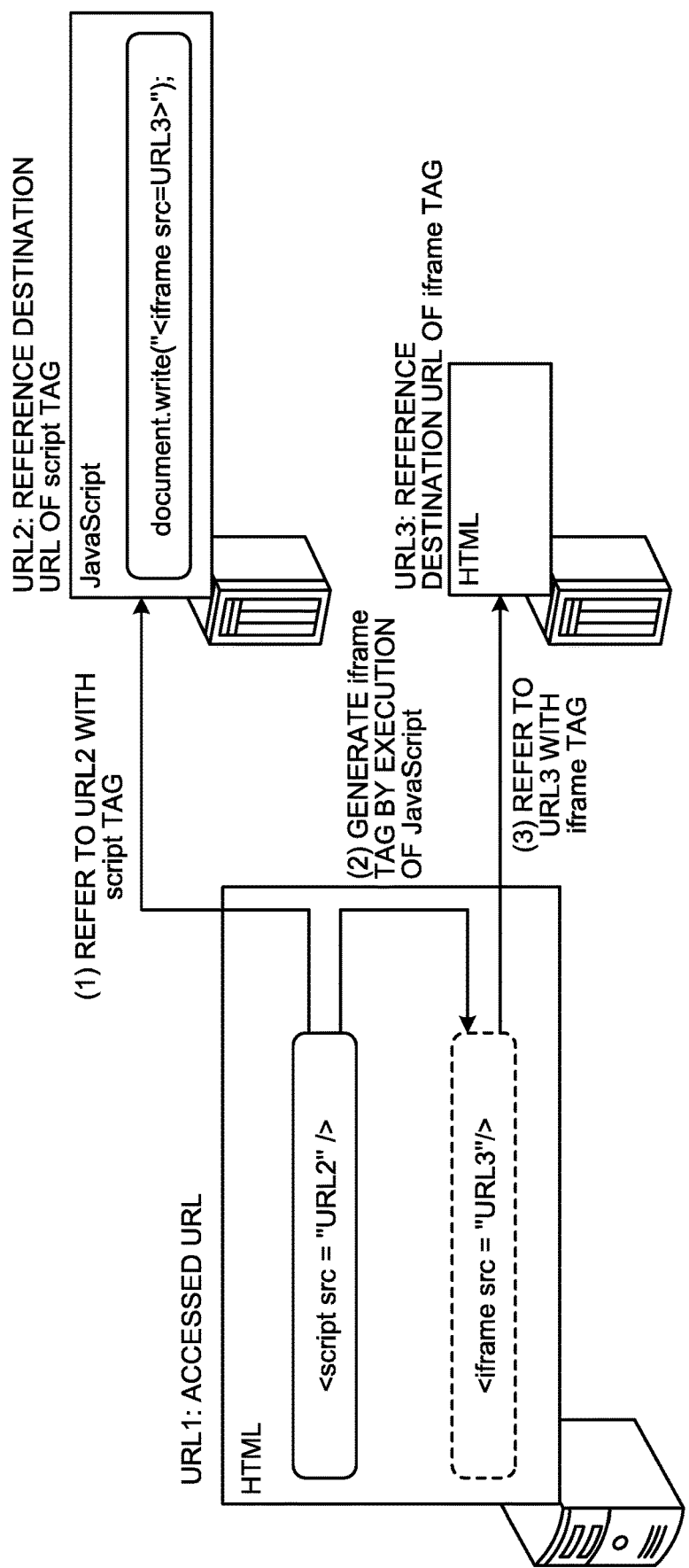
FIG. 7 is a diagram illustrating an example of transfer by external reference JavaScript.

This case will be explained with reference to FIG. 7. In FIG. 7, a URL that the access unit 252 has accessed first is assumed to be a URL1, a reference destination URL of a script tag of the URL1 is assumed to be a URL2, and a reference destination URL of an iframe tag generated by execution of JavaScript of the URL2 is assumed to be a URL3. In such a case, when the access unit 252 accesses the URL1, the URL2 is referred with the script tag in the content of the URL1 ((1)), the iframe tag is generated by execution of JavaScript of the URL2 ((2)), and the URL3 is referred with the generated iframe tag ((3)).

Analysis of the HTML tag by the content analysis unit 257 can specify that the transfer source URL is the URL1 and the transfer destination URL is the URL3. Also in implementation of a normal browser, the URL1 is set to a Referer field of the HTTP request header in which the reference source URL is recorded in a request to the URL2 and the URL1 is set thereto also in a request to the URL3. That is to say, transfer information of the URL3 from the URL2 in which the transfer source URL is the URL 2 and the transfer destination URL is the URL3 is needed because the request to the URL3 is actually generated because of the execution of JavaScript of the URL2. Specification with the HTML tag and specification with the Referer information in the conventional technique however miss the transfer information.

To cope with the missing transfer information, when a script of an external website is executed, the script analysis unit 258 additionally records the URL (for example, the above-mentioned URL2) of the website containing the script and sets the URL to the transfer source URL. When grasping generation of a request to another URL (for example, the URL3) by execution of the script, the script analysis unit 258 records transfer information in which the transfer source URL is set to the above-mentioned external website (for example, the URL2) and the transfer destination URL is set to the URL (for example, the URL3) as a request destination by execution of the script. That is to say, the script analysis unit 258 records the above-mentioned transfer information of the URL3 from the URL2.

Furthermore, among the scripts such as JavaScript, there is a script generating a new script. Dynamic generation of the script is used for code obfuscation, code execution with an interval of a predetermined period of time, and the like, and uses a function such as eval, setInterval, and setTimeout.

The script analysis unit 258 monitors a function called in the execution of the script that is dynamically generated as described above and traces execution processing in order to specify transfer with the script. When, for example, grasping usage of the above-mentioned function such as eval, setInterval, and setTimeout in the execution of the script, the script analysis unit 258 records the hash value of the script as a generation source of a newly generated script, the hash value of the newly generated script, and an execution method of the script as the generation source (for example, a function name or a property name called by the generation source script). It should be noted that when the script analysis unit 258 traces the execution of the script, it may record not the hash value of the script but the script itself. (Controller)

Next, the controller 27 will be described. The controller 27 includes a URL list creator 271, an access instruction unit 272, the registration processor 273, a graph construction unit 274, and the graph analysis unit 275.

The URL list creator 271 creates a patrol target URL list as a URL list of websites (analysis target websites 12) that each browser emulator 25 patrols. The URL list creator 271 creates the patrol target URL list on the basis of, for example, the URLs of websites being on a published blacklist of malicious websites.

The access instruction unit 272 instructs the access unit 252 of each browser emulator 25 to access the URLs indicated in the patrol target URL list (URL list).

The registration processor 273 acquires the log of each browser emulator 25 and registers it in the analysis information database 24.

The graph construction unit 274 combines pieces of transfer information in the analysis information database 24 to construct a directed graph representing transfer caused by the access to the analysis target website 12. Then, the graph construction unit 274 outputs the constructed directed graph to the graph storage unit 28. The directed graph is a directed graph while the transfer source URL and the transfer destination URL indicated by the transfer information are nodes and the transfer method is an edge, and is, for example, a directed graph illustrated in FIG. 8.

Figure 8:
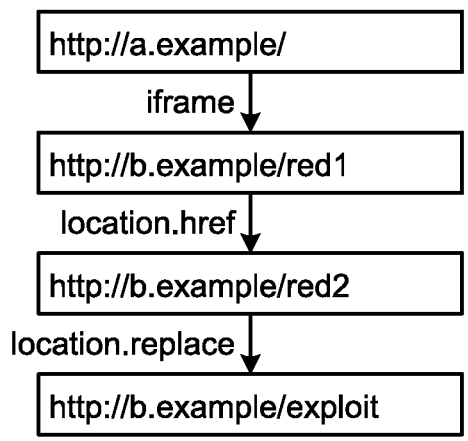
FIG. 8 is a diagram illustrating an example of construction of a directed graph of transfer.

The directed graph illustrated in FIG. 8 indicates that the access is transferred to "http://b.example/red1" with an iframe tag in "http://a.example/", is transferred to "http://b.example/red2" with a function of location.href of a script in "http://b.example/red1", and then, is transferred to "http://b.example/exploit" with a function of location.replace of a script in "http://b.example/red2".

The graph construction unit 274 adds a directed graph to which a trace result of the script execution processing has been reflected to the above-mentioned directed graph so as to encapsulate it. The graph construction unit 274 uses the directed graph illustrated in FIG. 8 as a base and adds the directed graph to which the trace result of the script execution processing has been reflected to the above-mentioned directed graph so as to encapsulate it, thereby constructing a directed graph illustrated in FIG. 9, for example. That is to say, the graph construction unit 274 adds a node of a script "JavaScript A" contained in "http://b.example/red1" into a node "http://b.example/red1" with reference to the transfer information in the analysis information database 24. The graph construction unit 274 adds a node of a script "JavaScript B" contained in "http://b.example/red2" into a node "http://b.example/red2" and further adds a script "JavaScript C" generated by the script "JavaScript B" into the node "http://b.example/red2". The graph construction unit 274 connects the node of the script "JavaScript B" and the script "JavaScript C" by an edge indicating a function (eval) used for execution of the script "JavaScript C". Moreover, the graph construction unit 274 adds a node of a script "JavaScript D" contained in "http://b.example/exploit" into a node "http://b.example/exploit".

In the above-mentioned manner, for transfer with the HTML tag, the graph construction unit 274 searches the content of the transfer source URL for the HTML tag as the transfer method with which the transfer destination URL is designated on the basis of the transfer information in the analysis information database 24 and sets the HTML tag to the edge to the node as the transfer destination URL from the node as the transfer source URL. Furthermore, for transfer with the script, the graph construction unit 274 searches the content of the transfer source URL for the execution source script of the transfer code with which the transfer destination URL is designated. The graph construction unit 274 sets the function used in the execution source script to the edge to the node as the transfer destination URL from the node as the execution source script of the transfer source URL. When the script is dynamically generated, the graph construction unit 274 traces from a finally generated script to a generation source script and connects the generation source script to the generated script with the edge.

Figure 9:
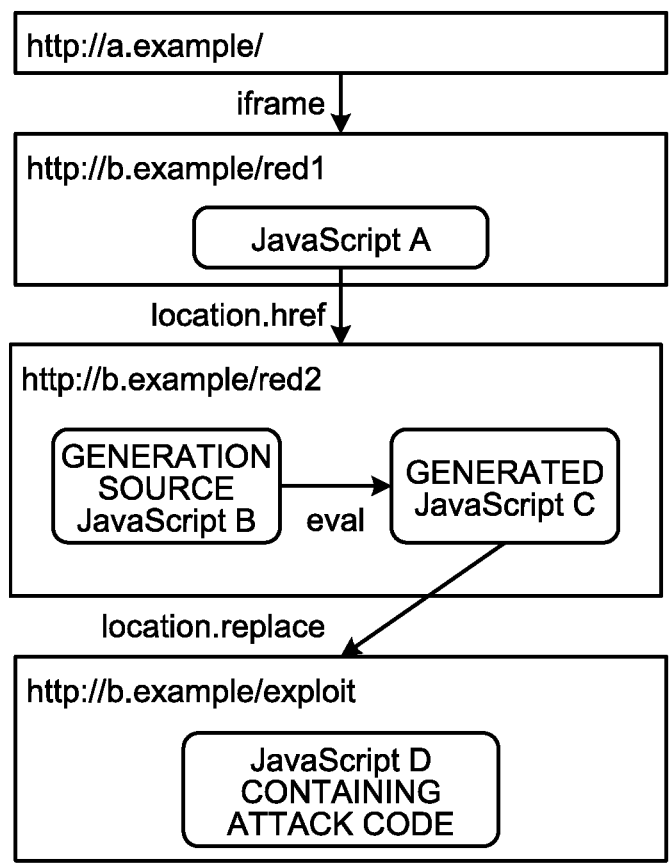
FIG. 9 is a diagram illustrating an example of a directed graph of transfer that extends to encapsulate a directed graph of script execution.

The graph analysis unit 275 analyzes the directed graph stored in the graph storage unit 28 and outputs an analysis result. For example, when JavaScript D containing an attack code is detected in the node "http://b.example/exploit" in the directed graph illustrated in FIG. 9, the graph analysis unit 275 traces the directed graph in the reverse order from JavaScript D as a starting point to thereby specify that "JavaScript C" generated in the node "http://b.example/red2", "JavaScript B" as the generation source thereof, "JavaScript A" contained in the node "http://b.example/red1", and the iframe tag contained in the node "http://a.example/" in FIG. 9 are involved in the attack. The graph analysis unit 275 outputs this result as the analysis result.

That is to say, the graph analysis unit 275 can specify "http://a.example/" as the landing URL, "http://b.example/red1" and "http://b.example/red2" as the redirect URLs, and "http://b.example/exploit" as the exploit URL, and specify that the iframe tag contained in "http://a.example/" is involved in the attack. With this specification, when, for example, a website of an a.example domain is a general website, the system can notify a manager of the website of the iframe tag (that is, a place that is considered to be compromised) specified as described above to recommend deletion of the tag and so on.

Figure 10A:
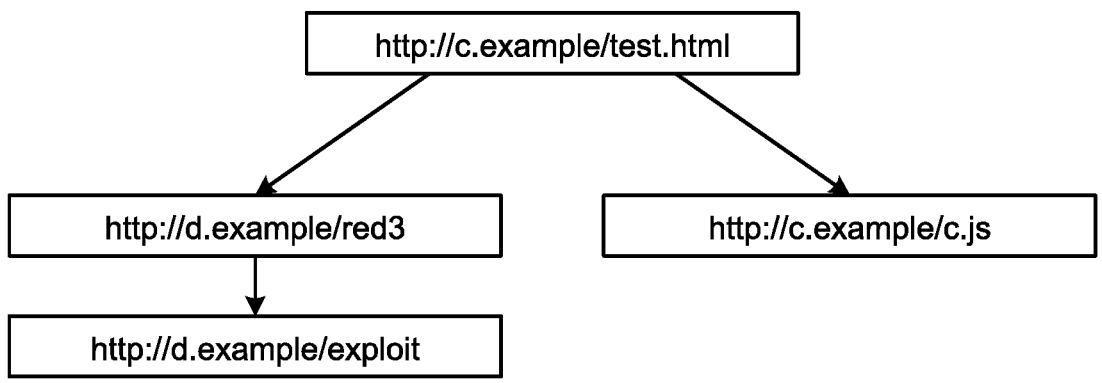
FIG. 10A is a diagram illustrating an example of a directed graph of transfer that is constructed by an existing method.
Figure 10B:
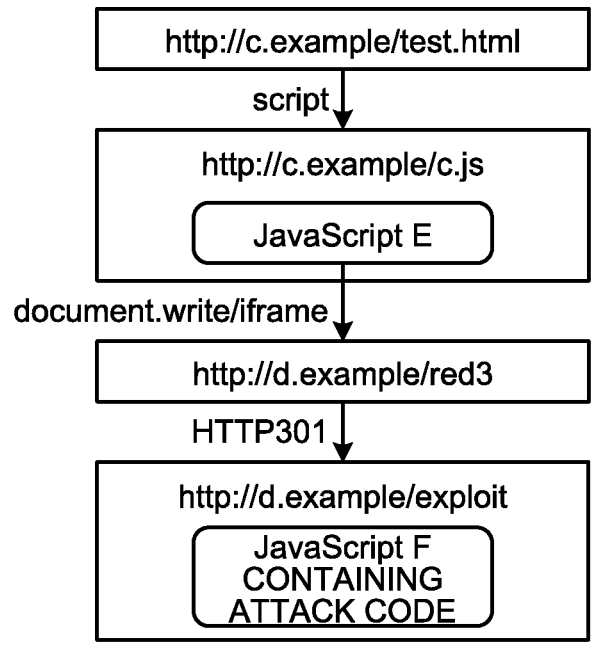
FIG. 10B is a diagram illustrating an example of a directed graph of transfer that is constructed by a graph construction unit in the embodiment.

When the transfer referring to the content of the external website is performed (see FIG. 7), the graph construction unit 274 constructs the directed graph as follows. FIG. 10A illustrates an example of the directed graph of transfer that is constructed by the existing method for comparison. FIG. 10B is a diagram illustrating an example of the directed graph of transfer that is constructed by the graph construction unit 274 in the embodiment.

In this example, an iframe tag causing transfer to "http://d.example/red3" is inserted into "http://c.example/test.html" by executing a function of document.write of "JavaScript E" contained in "http://c.example/c.js", the access is transferred to "http://d.example/red3" with the iframe tag, and then, is transferred from "http://d.example/red3" to "http://d.example/exploit" with HTTP301.

In such a case, with the existing method illustrated in FIG. 10A, the directed graph having edges to the node "http://c.example/c.js" and the node "http://d.example/red3" from the node "http://c.example/test.html" as a starting point is generated because the iframe tag that actually causes transfer is inserted into the node "http://c.example/test.html". On the other hand, the graph construction unit 274 in the embodiment can specify that transfer to the node "http://d.example/red3" as illustrated in FIG. 10B is transfer with "document.write of JavaScript E+iframe tag (document.write/iframe)" contained in the node "http://c.example/c.js" because the transfer information describes insertion of the iframe tag with a function of document.write of "JavaScript E". The graph construction unit 274 can thereby construct the directed graph with an edge to the node "http://d.example/red3" from the node "http://c.example/test.html" as the starting point while passing through the node "http://c.example/c.js".

Also in the transfer in which the graph construction unit 274 refers to the content of the external website, the following effects can be provided by constructing the directed graph representing the transfer. For example, when JavaScript F containing an attack code is detected in the node "http://d.example/exploit" in the directed graph illustrated in FIG. 10B, the graph analysis unit 275 traces the directed graph illustrated in FIG. 10B in the reverse order to thereby specify that the node "http://d.example/red3", the node "http://c.example/c.js", JavaScript E contained in the node "http://c.example/c.js", the iframe tag inserted by JavaScript E, the script tag contained in the node "http://c.example/test.html", and the like are involved in the attack.

If a website of a c.example domain is a general website, the system can notify a manager of the website of the script tag (that is, a place that is considered to be compromised) specified as described above to recommend deletion of the tag and so on. The place that is considered to be compromised may be a place (for example, document.write of JavaScript E) at which the transfer causing change of the domain has occurred or a place at which the transfer (for example, transfer with document.write) by a specific method has occurred in the process of tracing the directed graph in the reverse order.

(Analysis Information Database)

Next, the analysis information database 24 will be described. The analysis information database 24 stores therein the access log and the transfer information as analysis information. As illustrated in FIG. 11A, the access log is, for example, information in which "ID" as identification information of the access log, "access URL" as an accessed URL when the browser emulator 25 has accessed the URL of the analysis target website 12, "time stamp" indicating the date and time of the access to the URL, "environment information" indicating the client environment information that the browser emulator 25 has simulated in the access to the URL, and the like are made to correspond to one another. As illustrated in FIG. 11B, the transfer information is, for example, information in which "ID" indicating the ID of the access log having the access URL corresponding to the landing URL of the transfer information, "time stamp" indicating the date and time of transfer or script execution, "transfer source URL" indicating the transfer source URL, "transfer destination URL" indicating the transfer destination URL, "method" indicating the transfer method or the execution method, "execution script" recording the identification information (for example, the hash value) of a script executing a transfer code, "generated script" recording the identification information (for example, the hash value) of a script that has been dynamically generated by script execution, and the like are made to correspond to one another. It is needless to say that the access log and the transfer information may contain information other than the above-described ones.

A graph construction method by the graph construction unit 274 using the access log illustrated in FIG. 11A and the transfer information illustrated in FIG. 11B is described as an example.

For example, it is found from information corresponding to ID=1 in FIG. 11B that access to "http://a.example/" corresponding to ID=1 in FIG. 11A is transferred from "http://a.example/" to "http://b.example/red1" with an iframe tag in "http://a.example/". Subsequently, it is found that in "http://b.example/red1", a script "0123456789abcdef" is executed and the access is transferred to "http://b.example/red2" with location.href. Then, it is found that in "http://b.example/red2", a script "abcdef9876543210" generates a script "012345678901234" by eval. Furthermore, it is found that "012345678901234" is executed and the access is transferred to "http://b.example/exploit/" with location.replace.

The graph construction unit 274 constructs the directed graph (see FIG. 9) from the landing URL "http://a.example/" to "http://b.example/exploit/" by thus tracing the transfer information in the analysis information database 24.

It is found from information corresponding to ID=51 in FIG. 11B that access to "http://c.example/test.html" corresponding to ID=51 in FIG. 11A is transferred from "http://c.example/test.html" to "http://c.example/c.js" with a script tag in "http://c.example/test.html". Subsequently, it is found that in "http://c.example/c.js", a script "fedcbaaaaaabcdef" is executed and an iframe tag causing transfer to "http://d.example/red3" is inserted into "http://c.example/test.html" with document.write. Furthermore, it is found that when accessed to "http://d.example/red3" as the transfer destination, the access is transferred to "http://d.example/exploit" by automatic transfer with HTTP301.

The graph construction unit 274 constructs the directed graph from the landing URL "http://c.example/test.html" to "http://d.example/exploit/" by thus tracing the transfer information in the analysis information database 24 (see FIG. 10B).

With the system described above, when the access to the website is automatically transferred to the different website, the interpretation processing on the content of the website and the execution processing on the script contained in the content are traced and the transfer information is recorded and accumulated. When the access is finally transferred to the malicious website conducting the drive-by download attack, the directed graph is constructed on the basis of the accumulated transfer information. The directed graph is traced in the reverse order to thereby specify the place of the content and the place of the script causing the transfer and the URL of the website involved in the transfer.

(Processing Procedures)

Figure 12:
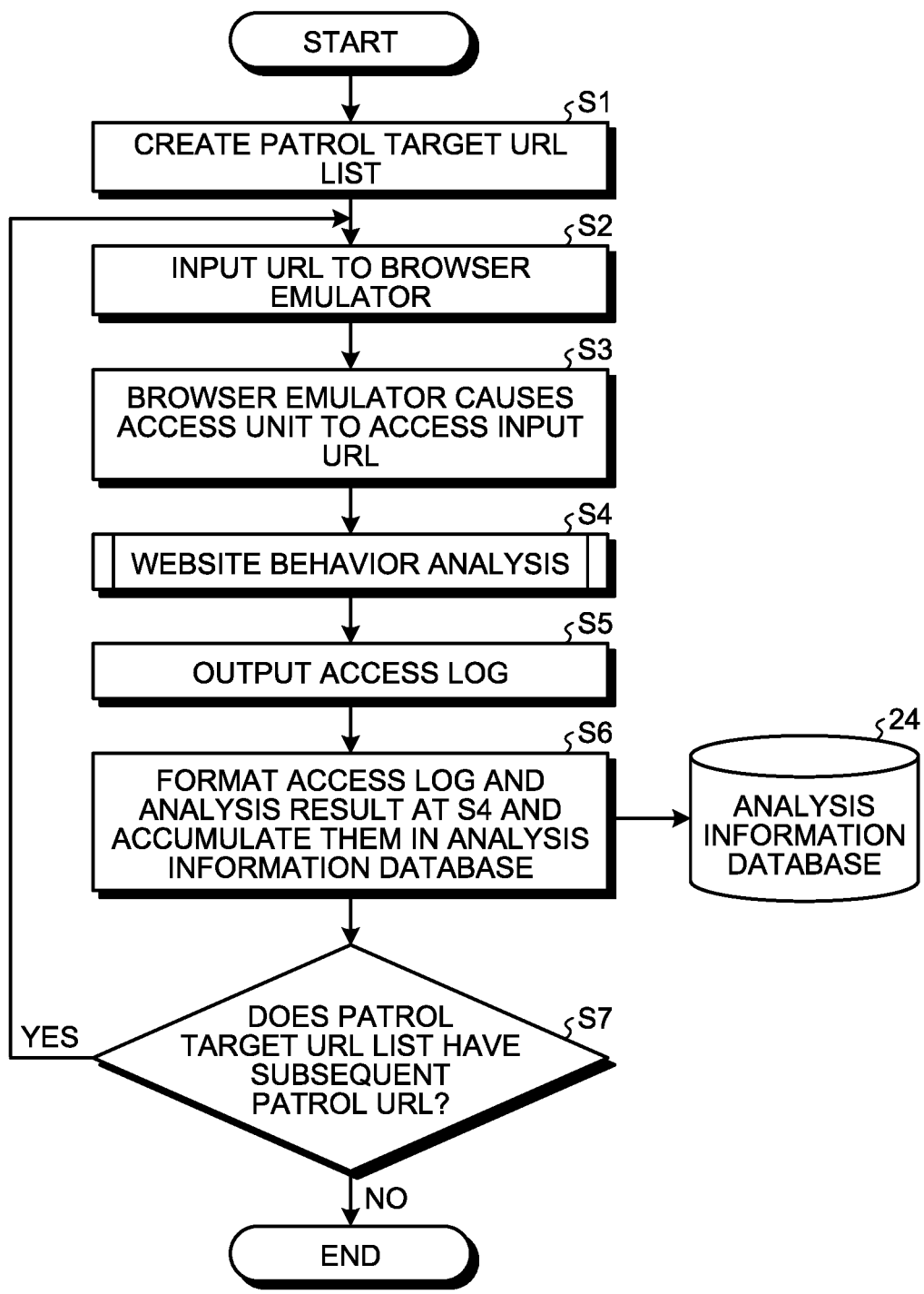
FIG. 12 is a flowchart illustrating an example of system processing procedures.

Next, an example of processing procedures of the system will be described with reference to FIG. 12.

First, the URL list creator 271 creates a patrol target URL list (S1). The URL list creator 271 creates, for example, the patrol target URL list on the basis of a published blacklist of malicious websites, websites capable of being collected through a search engine, and the like.

The access instruction unit 272 inputs a URL on the patrol target URL list to the browser emulator 25 (S2) and the browser emulator 25 causes the access unit 252 to access the URL input at S2 (S3).

The access unit 252 interprets the content of the accessed website by the HTTP header parser unit 253, the content parser unit 254, and the script interpreter unit 255, and analyzes it by each of the HTTP header analysis unit 256, the content analysis unit 257, and the script analysis unit 258 on the basis of a result of the interpretation (S4: website behavior analysis). The content is acquired also from a website to which the access to the patrol target URL has been transferred and is analyzed in the same manner. Details of the processing at S4 will be described later.

At S2, the access instruction unit 272 may cause one browser emulator 25 to access a plurality of URLs or cause the browser emulators 25 to access different URLs.

After S4, the access unit 252 outputs an access log (S5). That is to say, the access unit 252 outputs, as the access log, a result of the access to the URL input by the access instruction unit 272. Then, the registration processor 273 formats the access log output at S5 and the analysis results (transfer information) at S4, and accumulates them in the analysis information database 24 (see FIG. 11A and FIG. 11B) (S6).

After S6, when the patrol target URL list has a subsequent patrol URL (Yes at S7), the process returns to S2. On the other hand, when the patrol target URL list has no subsequent patrol URL (No at S7), the processing is finished.

When the access log and the transfer information are accumulated in the analysis information database 24 in the above-mentioned manner, the graph construction unit 274 constructs a directed graph indicating transfer between URLs on the basis of the access log and the transfer information accumulated in the analysis information database 24 and stores it in the graph storage unit 28. The graph analysis unit 275 specifies, for example, a content place and a script place causing the transfer and the URLs involved in an attack with reference to the directed graph in the graph storage unit 28.

Figure 13:
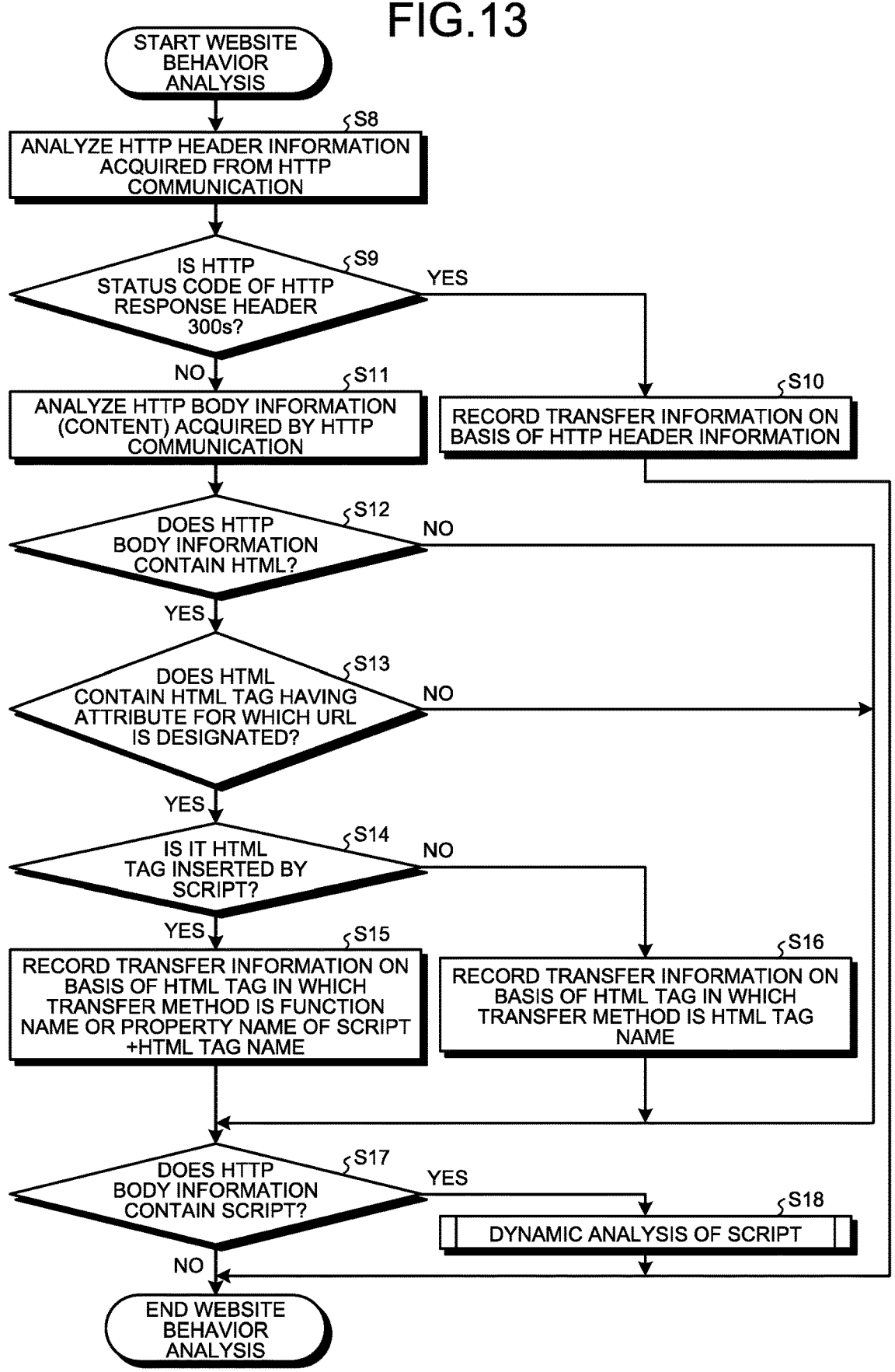
FIG. 13 is a flowchart illustrating an example of website behavior analysis.

Next, processing of the website behavior analysis at S4 in FIG. 12 will be described in detail with reference to FIG. 13.

First, the access unit 252 causes the HTTP header parser unit 253 to interpret an HTTP header from HTTP communication occurring in the access to the patrol target URL and causes the HTTP header analysis unit 256 to interpret a result of the interpretation. That is to say, the HTTP header analysis unit 256 analyzes HTTP header information acquired by the HTTP communication to the patrol target URL (S8).

When the HTTP status code of an HTTP response header is the 300s (number indicating redirect (transfer) (Yes at S9) as a result of the analysis by the HTTP header analysis unit 256, transfer information in which the transfer source URL is the request URL of an HTTP request header, the transfer destination URL is the URL in a Location field of the HTTP response header, and the transfer method is the HTTP status code is recorded (S10: recording of the transfer information based on the HTTP header information) and the processing is finished. On the other hand, when the status code of the HTTP response header is not the 300s (No at S9), the process proceeds to S11.

At S11, the access unit 252 causes the content parser unit 254 to interpret an HTTP body from the HTTP communication occurring in the access to the patrol target URL and causes the content analysis unit 257 to analyze a result of the interpretation. That is to say, the content analysis unit 257 analyzes HTTP body information (content) acquired by the HTTP communication (S11). When the HTTP body information contains HTML as a result of the analysis by the content analysis unit 257 (Yes at S12), the process proceeds to S13. On the other hand, when the HTTP body information contains no HTML (No at S12), the process proceeds to S17.

When the HTML contains an HTML tag having an attribute for which a URL is designated at S13 (Yes at S13), the process proceeds to S14. On the other hand, when the HTML contains no HTML tag having the attribute for which the URL is designated at S13 (No at S13), the process proceeds to S17.

When the HTML tag is an HTML tag inserted by a script at S14 (Yes at S14), the script analysis unit 258 records transfer information in which the transfer source URL is the URL of the content (that is, the content to which the script belongs), the transfer destination URL is the URL designated by the HTML tag, and the transfer method is the function name or the property name of the script (that is, the function name of a function or the assigned property name used for insertion of the HTML tag)+the HTML tag name (S15: recording of the transfer information based on the HTML tag in which the transfer method is the function name or the property name of the script+the HTML tag name).

On the other hand, when the HTML tag is not the HTML tag inserted by the script at S14 (No at S14), the script analysis unit 258 records transfer information in which the transfer source URL is the URL of the content (that is, the content to which the HTML tag belongs), the transfer destination URL is the URL designated by the HTML tag, and the transfer method is the HTML tag name (S16: recording of the transfer information based on the HTML tag in which the transfer method is the HTML tag name). Thereafter, the process proceeds to S17.

At S17, when it is determined that the HTTP body information contains a script as a result of the analysis of the HTTP body information by the content analysis unit 257 (Yes at S17), the script interpreter unit 255 is caused to interpret the script and dynamic analysis of the script by the script analysis unit 258 is executed in a process of the interpretation (S18). On the other hand, the HTTP body information contains no script (No at S17), the processing is finished. Details of the processing of the dynamic analysis of the script at S18 will be described later. In the case in which transfer to a different URL occurs when the above-mentioned website behavior analysis processing is finished, the browser emulator 25 analyzes a website of the URL in the same manner as described above.

Next, the processing of the dynamic analysis of the script at S18 in FIG. 13 will be described in detail with reference to FIG. 14.

First, the script analysis unit 258 executes the dynamic analysis of the script acquired from the HTTP body information (content) (S19) and determines whether the script is a script contained in a file of an external website. That is to say, the script analysis unit 258 determines whether the script is an externally referred script (S20). When the script analysis unit 258 determines that the script is the externally referred script (Yes at S20), it additionally holds an external reference destination URL (that is, the URL of the website to which the script belongs) (S21) and the process proceeds to S22. On the other hand, when the script analysis unit 258 determines that the script is not the externally referred script (No at S20), the process proceeds to S22.

When the script analysis unit 258 detects function call or property assignment for transfer to a designated URL during execution of the script at S22 (Yes at S22), the process proceeds to S23. On the other hand, when the script analysis unit 258 detects neither the function call nor the property assignment for transfer to the designated URL (No at S22), the process proceeds to S26. S26 will be described later.

When the external reference destination URL is held at S23 (Yes at S23), the script analysis unit 258 records transfer information in which the transfer source URL is the external reference destination URL, the transfer destination URL is the URL designated by the externally referred script, and the transfer method is the function name or the property name of the externally referred script (that is, the function name of the function called by the script or the property name assigned by the script). Furthermore, the script analysis unit 258 records the execution source script (externally referred script) in the transfer information (S24: recording of the transfer information based on the execution of the externally referred script). Thereafter, the process proceeds to S26.

On the other hand, when no external reference destination URL is held at S23 (No at S23), the script analysis unit 258 records transfer information in which the transfer source URL is the URL of the content (that is, the content to which the script belongs), the transfer destination URL is the URL designated by the script, and the transfer method is the function name or the property name of the script (that is, the function name of the function called by the script or the property name assigned by the script). Furthermore, the script analysis unit 258 records the execution source script (the script) in the transfer information (S25: recording of the transfer information based on the execution of the script acquired from the content). Thereafter, the process proceeds to S26.

Subsequently, in the same manner as described above, the script analysis unit 258 records the external reference destination URL preferentially when the external reference destination URL is held whereas it records the URL of the content to which the script that is being executed belongs in the transfer information when no external reference destination URL is held.

When the script analysis unit 258 detects function call or property assignment for change of contents of the content (that is, the content to which the script belongs) during the execution of the script at S26 (Yes at S26), the script analysis unit 258 sets an identifier to the change target content (S27). That is to say, the script analysis unit 258 records the content to which change has been added. Thereafter, the process proceeds to S28. On the other hand, when the script analysis unit 258 detects neither the function call nor the property assignment for change of the contents of the content (No at S26), the process proceeds to S28.

The above-mentioned change of the contents of the content is, for example, insertion of a new HTML tag into the content. When the new HTML tag is inserted, the pieces of processing from S13 to S18 are executed for the inserted HTML tag in the same manner. A method in which, for example, the hash value of the script or the URL causing the change of the contents of the content is used for the identifier set to the change target content at S27, or the like, is considered but it is needless to say that another method may be employed.

When the script analysis unit 258 detects function call for execution of a newly generated script during the execution of the script at S28 (Yes at S28), the script analysis unit 258 records a generation source script, a generated script, and an execution method (execution method of the generation source script) in the transfer information (S29). That is to say, when the script analysis unit 258 detects generation of the new script by the execution of the script, the script analysis unit 258 records transfer information in which the transfer source URL is the URL of the content to which the generation source script belongs, the execution method is the execution method of the generation source script, the generated script is the script generated by the generation source script, and the execution script is the generation source script.

On the other hand, when the script analysis unit 258 detects no function call for execution of the newly generated script during the execution of the script at S28 (No at S28), the script analysis unit 258 finishes the processing.

Figure 14:
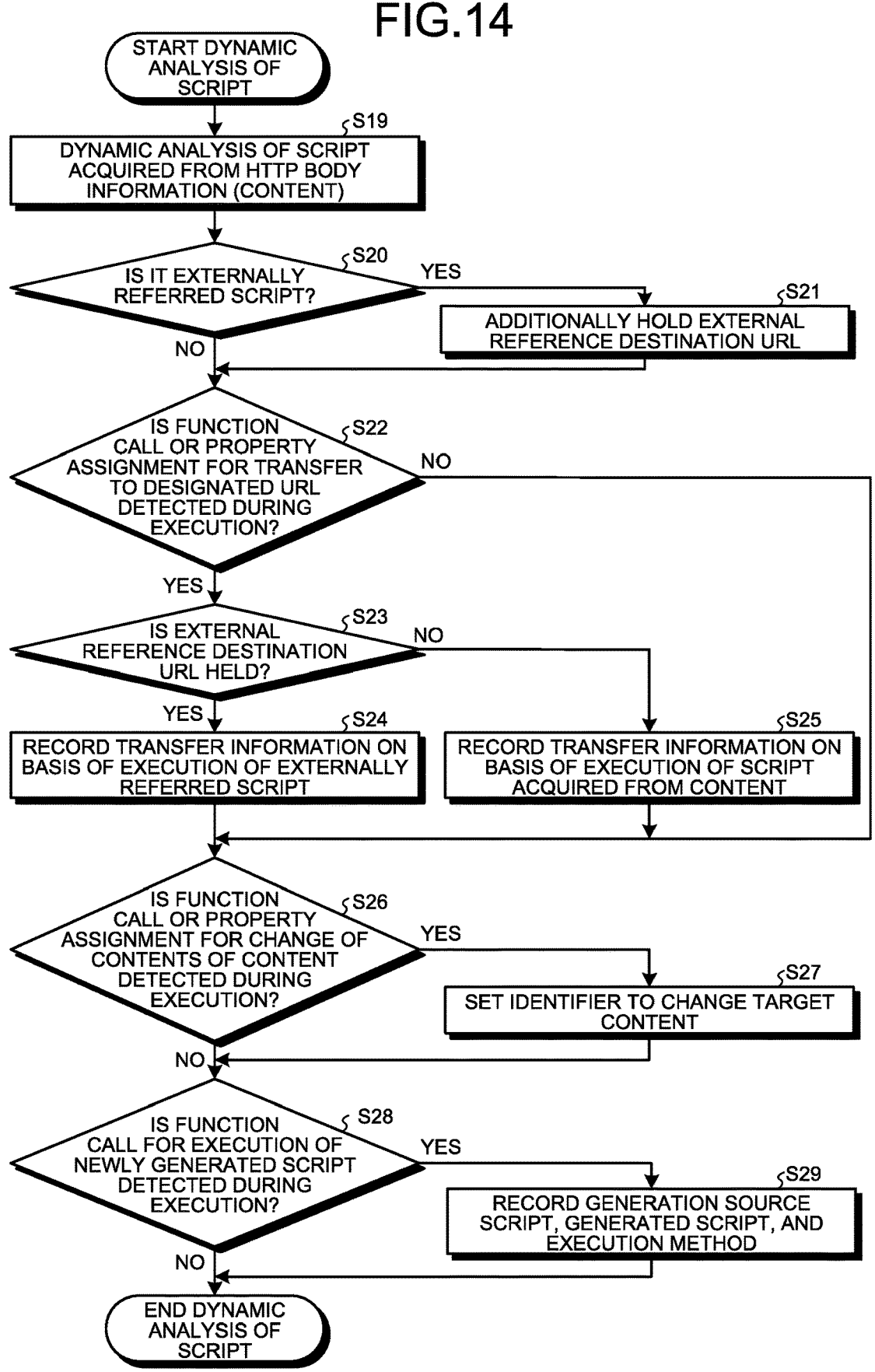
FIG. 14 is a flowchart illustrating an example of script dynamic analysis.

At S22, S26, and S28 described above, the respective pieces of processing including the function call and the property assignment that the script analysis unit 258 monitors during the execution of the script may be executed with the procedures illustrated in FIG. 14 or may be executed in the different order.

With the system described above, when the access to the website is automatically transferred to the different website, the interpretation processing on the content of the website and the execution processing on the script contained in the content are traced and the transfer information is recorded and accumulated. When the access is finally transferred to the malicious website conducting the drive-by download attack, the directed graph is constructed on the basis of the accumulated transfer information. The directed graph is traced in the reverse order to thereby specify the place of the content and the place of the script causing the transfer, and the URL of the website involved in the transfer.

The browser emulator manager 23 described in the above-mentioned embodiment can be implemented by installing the browser emulator manager 23 executing the above-mentioned pieces of processing on a desired information processing apparatus (computer). For example, the information processing apparatus is caused to execute the above-mentioned browser emulator manager 23 provided as package software or on-line software, thereby causing the information processing apparatus to function as the browser emulator manager 23. The information processing apparatus includes a desktop-type or notebook-type personal computer. In addition, the information processing apparatus covers mobile communication terminals such as a smart phone, a portable phone, and a personal handyphone system (PHS) and slate terminals such as a personal digital assistant (PDA). The browser emulator manager 23 may be implemented as a Web server or a cloud.

Program

Figure 15:
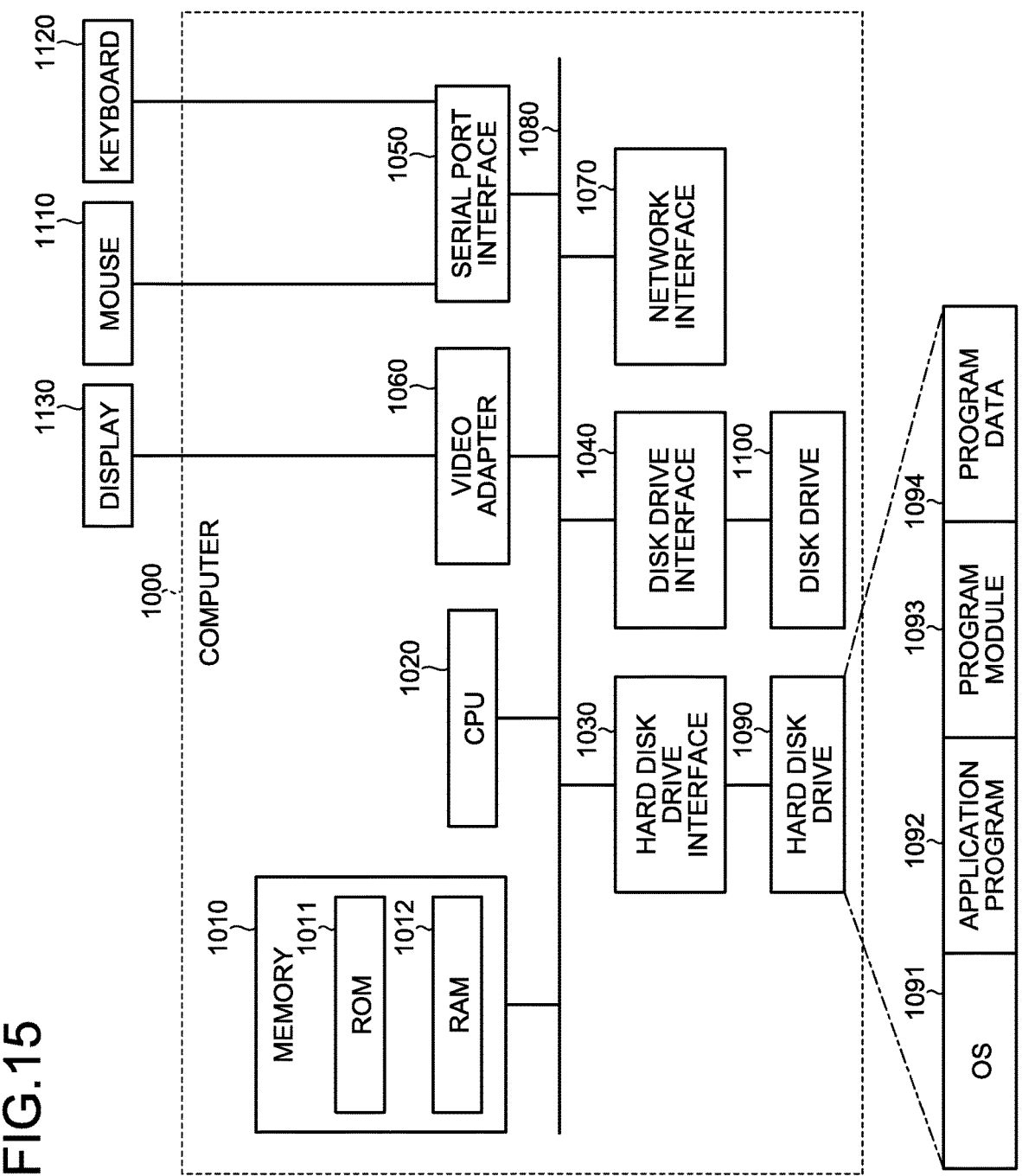
FIG. 15 is a diagram illustrating a computer executing an analysis program.

FIG. 15 is a diagram illustrating a computer executing an analysis program. As illustrated in FIG. 15, a computer 1000 includes, for example, a memory 1010, a central processing unit (CPU) 1020, a hard disk drive interface 1030, a disk drive interface 1040, a serial port interface 1050, a video adapter 1060, and a network interface 1070. The respective parts are connected to one another through a bus 1080.

The memory 1010 includes a read only memory (ROM) 1011 and a random access memory (RAM) 1012. The ROM 1011 stores therein, for example, a boot program such as a basic input output system (BIOS). The hard disk drive interface 1030 is connected to a hard disk drive 1090. The disk drive interface 1040 is connected to a disk drive 1100. For example, a detachable storage medium such as a magnetic disk and an optical disk is inserted into the disk drive 1100. A mouse 1110 and a keyboard 1120, for example, are connected to the serial port interface 1050. A display 1130, for example, is connected to the video adapter 1060.

As illustrated in FIG. 15, the hard disk drive 1090 stores therein, for example, an operating system (OS) 1091, an application program 1092, a program module 1093, and program data 1094. The respective pieces of information and data described in the above-mentioned embodiment are stored in, for example, the hard disk drive 1090 and the memory 1010.

The analysis program is stored in the hard disk drive 1090 as, for example, the program module 1093 describing instructions that the computer 1000 executes. To be specific, the program module 1093 describing the respective pieces of processing that the browser emulator manager 23 described in the above-mentioned embodiment executes is stored in the hard disk drive 1090.

Furthermore, the pieces of data that are used for the pieces of information processing by the analysis program are stored in, for example, the hard disk drive 1090 as program data. The CPU 1020 reads the program module 1093 and the program data 1094 stored in the hard disk drive 1090 onto the RAM 1012 if necessary and executes the above-mentioned respective procedures.

The program module 1093 and the program data 1094 related to the analysis program are not limited to be stored in the hard disk drive 1090 and they may be stored in, for example, a detachable storage medium and read out by the CPU 1020 through the disk drive 1100 or the like. Alternatively, the program module 1093 and the program data 1094 related to the analysis program may be stored in another computer connected through a network such as a local area network (LAN) and a wide area network (WAN) and read out by the CPU 1020 through the network interface 1070.

REFERENCE SIGNS LIST 1, 2 NETWORK
3 PACKET TRANSFER DEVICE
12 ANALYSIS TARGET WEBSITE
23 BROWSER EMULATOR MANAGER
24 ANALYSIS INFORMATION DATABASE
25 BROWSER EMULATOR
26 HOST SYSTEM
27 CONTROLLER
28 GRAPH STORAGE UNIT
251 CLIENT ENVIRONMENT SIMULATION UNIT
252 ACCESS UNIT
253 HTTP HEADER PARSER UNIT
254 CONTENT PARSER UNIT
255 SCRIPT INTERPRETER UNIT
256 HTTP HEADER ANALYSIS UNIT
257 CONTENT ANALYSIS UNIT
258 SCRIPT ANALYSIS UNIT
271 URL LIST CREATOR
272 ACCESS INSTRUCTION UNIT
273 REGISTRATION PROCESSOR
274 GRAPH CONSTRUCTION UNIT
275 GRAPH ANALYSIS UNIT

The invention claimed is:

1. An analysis apparatus analyzing content and a script of a website, the analysis apparatus comprising:
a memory; and
a processor coupled to the memory and programmed to execute a process comprising:
accessing the website using a browser;
recording, in transfer information, a URL of the website as a transfer source URL, a URL of another web site as a transfer destination URL, a function name or a property name of the script used for transfer as a transfer method to the transfer destination URL, and identification information of the script as an execution source script when the transfer to the other website is caused by execution of the script in the website, and records, in the transfer information, identification information of a generation source script of a new script as the execution source script in the website, identification information of the new script as a generated script, and a function name or a property name of the generation source script used for generation as a script execution method when the script of the website generates the new script; and
constructing a directed graph representing URLs of a series of websites that the browser has accessed, the transfer method to the URL, the script used for the transfer, and the script execution method, the directed graph including the transfer source URL and the transfer destination URL recorded in the transfer information each as a first type of node, each first type of node being connected to each other in the directed graph based on the series of web sites that the browser has accessed, the execution source script and the generated script in the transfer source URL are each a second type of node encapsulated within the first type of node of the transfer source URL, and the transfer method recorded in the transfer information is an edge corresponding to a connection between the first type of nodes in the directed graph, and the script execution method recorded in the transfer information is an edge corresponding to a connection between the second type of nodes in the directed graph.

2. The analysis apparatus according to claim 1, wherein the process further comprises:
in the case in which an HTTP response in access to the website is an HTTP response indicating transfer, recording, in the transfer information, the URL of the website as the transfer source URL, a transfer destination URL contained in an HTTP response header from the website as the transfer destination URL, and an HTTP status code number contained in the HTTP response header as the transfer method to the transfer destination URL; and
in the case in which the HTTP response in the access to the web site is not the HTTP response indicating transfer, recording, in the transfer information, the URL of the website as the transfer source URL, the URL of the other website as the transfer destination URL, and an HTML tag as the transfer method to the transfer destination URL when the transfer to the other web site is caused by interpretation of the HTML tag in the content of the website.

3. The analysis apparatus according to claim 1, wherein the process comprises:
when an HTML tag instructing transfer to the other website is inserted into the content of the website by execution of the script, recording, in the transfer information, the URL of the website as the transfer source URL, the URL of the other website as the transfer destination URL, the HTML tag and the function name or the property name of the script that has inserted the HTML tag as the transfer method to the transfer destination URL, and the identification information of the script as the execution source script.

4. The analysis apparatus according to claim 1, wherein the process comprises:
when a script read from the other website is executed and access to the other website is transferred to a different website by interpretation of the content of the web site, recording, in the transfer information, the URL of the other website as the transfer source URL, a URL of the different website as the transfer destination URL, a function name or a property name of the script used for transfer as the transfer method, and identification information of the script as the execution source script.

5. The analysis apparatus according to claim 1, wherein the process further comprises:
analyzing a transfer process from a node serving as a root of the directed graph to a node serving as a starting point set to any of the nodes constituting the directed graph, an execution process of the script, and a place of the content or a place of the script causing the transfer to the node as the starting point by tracing the directed graph in reverse order to the node serving as the root of the directed graph from the node as the starting point.

6. An analysis method of analyzing content and a script of a website, the analysis method comprising:
accessing the website using a browser;
recording, in transfer information, a URL of the website as a transfer source URL, a URL of another web site as a transfer destination URL, a function name or a property name of the script used for transfer as a transfer method to the transfer destination URL, and identification information of the script as an execution source script when the transfer to the other website is caused by execution of the script in the website, and
recording, in the transfer information, identification information of a generation source script of a new script as the execution source script in the website, identification information of the new script as a generated script, and a function name or a property name of the generation source script used for generation as a script execution method when the script of the website generates the new script; and
constructing a directed graph representing URLs of a series of websites that the browser has accessed, the transfer method to the URL, the script used for the transfer, and the script execution method, the directed graph including the transfer source URL and the transfer destination URL recorded in the transfer information each as a first type of node, each first type of node being connected to each other in the directed graph based on the series of web sites that the browser has accessed, the execution source script and the generated script in the transfer source URL are each a second type of node encapsulated within the first type of node of the transfer source URL, and the transfer method recorded in the transfer information is an edge corresponding to a connection between the first type of nodes in the directed graph, and the script execution method recorded in the transfer information is an edge corresponding to a connection between the second type of nodes in the directed graph.

7. A non-transitory computer readable storage medium having stored therein an analysis program for analyzing content and a script of a website, the analysis program causing a computer to execute a process comprising:
accessing the website using a browser;
recording, in transfer information, a URL of the website as a transfer source URL, a URL of another web site as a transfer destination URL, a function name or a property name of the script used for transfer as a transfer method to the transfer destination URL, and identification information of the script as an execution source script when the transfer to the other website is caused by execution of the script in the website, and recording, in the transfer information, identification information of a generation source script of a new script as the execution source script in the website, identification information of the new script as a generated script, and a function name or a property name of the generation source script used for generation as a script execution method when the script of the website generates the new script; and
constructing a directed graph representing URLs of a series of websites that the browser has accessed, the transfer method to the URL, the script used for the transfer, and the script execution method, the directed graph including the transfer source URL and the transfer destination URL recorded in the transfer information each as a first type of node, each first type of node being connected to each other in the directed graph based on the series of web sites that the browser has accessed, the execution source script and the generated script in the transfer source URL are each a second type of node encapsulated within the first type of node of the transfer source URL, and the transfer method recorded in the transfer information is an edge corresponding to a connection between the first type of nodes in the directed graph, and the script execution method recorded in the transfer information is an edge corresponding to a connection between the second type of nodes in the directed graph.

* * * * *